Jan. 5, 1926.
J. J. ZWALSH
1,568,937
AUXILIARY VEHICLE WHEEL
Filed Nov. 11, 1924
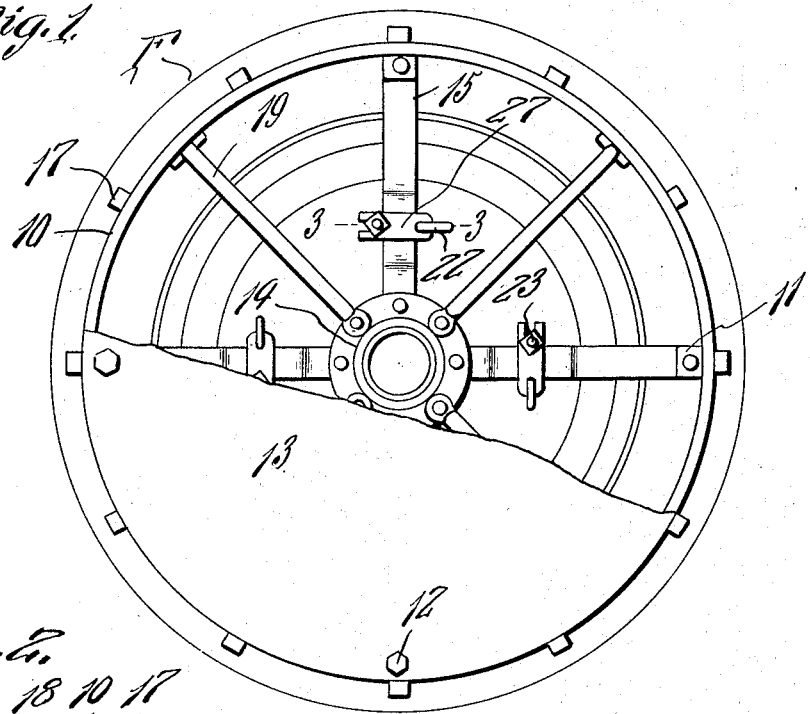
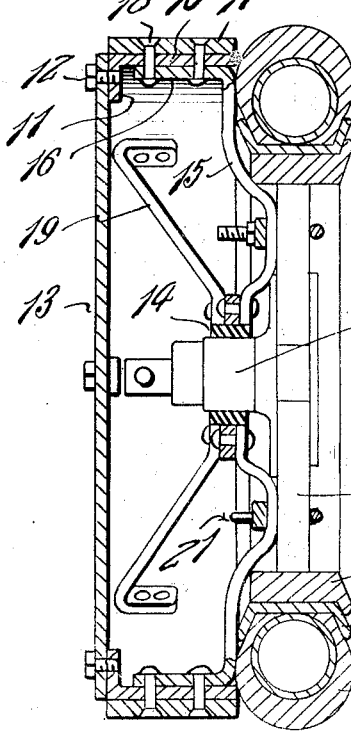
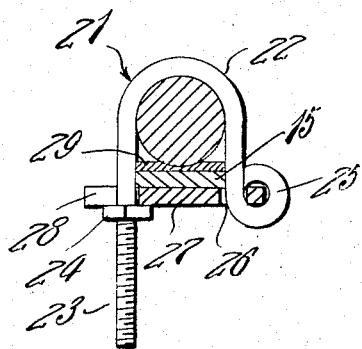
J. J. Zwalsh
INVENTOR
BY Victor J. Evans
ATTORNEY Patented Jan. 5, 1926.

1,568,937

UNITED STATES PATENT OFFICE.

JOHN J. ZWALSH, OF CLEVELAND, OHIO.

AUXILIARY VEHICLE WHEEL.

Application filed November 11, 1924. Serial No. 749,292.

*To all whom it may concern:*

Be it known that I, JOHN J. ZWALSH, a citizen of the United States, residing at Cleveland, in the county of Cuyahoga and State of Ohio, have invented new and useful Improvements in Auxiliary Vehicle Wheels, of which the following is a specification.

This invention relates to attachments to the wheels of motor vehicles and the like and has for its object the provision of a novel auxiliary wheel designed to be clamped upon the outer side of an ordinary automobile wheel and acting to prevent sinking of the vehicle wheels into the mud or into snow.

An important object is the provision of an auxiliary wheel of this character which is provided with means whereby it may be quickly and easily clamped upon the spokes of the vehicle wheel, the auxiliary wheel further including a central collar member adapted to be embracingly engaged upon the hub portion of a vehicle wheel.

Yet another object is the provision of a novel form of clamping means for securing the auxiliary wheel in place.

A still further object is the provision of an auxiliary wheel of this character which has its periphery provided with ribs or cleats which act to bite into soft or spongy ground and give the necessary traction in addition to preventing slipping and skidding.

An additional object is the provision of a device of this character which will be simple and inexpensive to manufacture, easy to apply or install, positive in action, efficient and durable in service, and a general improvement in the art.

With the above and other objects and advantages in view, the invention consists in the details of construction to be hereinafter more fully described and claimed, and illustrated in the accompanying drawings in which:

Figure 1 is a side elevation of the auxiliary wheel showing it applied to a vehicle wheel, parts being broken away;

Figure 2 is a section on the line 2—2 of Figure 1, the entire side disk being shown in applied position and not broken away as in Figure 1 and Figure 3 is a detail section on the line 3—3 of Figure 1.

Referring more particularly to the drawings, the letter A designates, broadly, a vehicle wheel of ordinary type including the usual hub B from which radiates spokes C carrying a felly D on which is mounted a rim E carrying a pneumatic cushion tire F.

In carrying out my invention I provide an auxiliary wheel which comprises a cylindrical band or rim 10 having an inturned flange 11 at its outer edge to which is adapted to be secured, as for instance by means of screws or bolts 12, a disk 13 which forms a closure for the outside of the auxiliary wheel. The numeral 14 represents a ring like collar which is of suitable size to be engaged upon the hub portion B of the vehicle wheel A. Suitably secured to and radiating from this collar 14 are spoke members 15 of compound curved shape which have their outer ends laterally extended as shown at 16 and riveted or otherwise secured against the inner periphery of the band 10. I also prefer to equip the periphery of the band with transverse ribs or cleats 17 which might be held in place by any desired means but which are here represented as secured by the rivets 18 employed for holding the spoke members to the band. Of course any desired number of these spokes may be provided though in the present instance I have represented only four as this is a really sufficient number. Located between the spokes 15 are radial brace members 19 which are secured to the collar 14 by any desired means and riveted or otherwise fastened to the inner periphery of the band 10 as clearly shown in the drawings.

In order to attach this auxiliary wheel to the vehicle wheel A, I make use of a plurality of clamp devices designated broadly by the numeral 21, which clamp devices are associated with and carried by the spokes 15. Each clamp comprises a U-shaped bolt member 22 having one leg 23 longer than the other and threaded so as to carry an adjusting nut 24. The other leg of the U-bolt is coiled or formed into an eye 25 pivotally engaged within a suitable hole 26 in a clamping plate 27 which has its other end forked as indicated at 28 for the accommodation of the longer leg of the U-bolt. The bolt 22 is designed to be engaged about a spoke C of the vehicle wheel A, subsequently to which the clamping plate 27 is intended to be swung into engagement with the vehicle wheel spokes in which position it will be firmly held by screwing down the nut 24. To avoid damaging the vehicle wheel spoke it is preferable that the clamping plate 27 be provided with a lining 29 of felt, rubber or other soft material.

In order to apply the auxiliary wheel, it is necessary that the disk 13 forming the closure therefor be removed in order that access may be had to the clamping devices 21. The device is placed against the vehicle wheel A, the nut 24 being spaced away from the bight portion of the U-bolts, and the U-bolts are then hooked about the vehicle wheel spokes c, subsequently to which the clamping plates 27 are swung into position and the nuts 24 turned down to effect the holding action. After this securing is accomplished, the closure disk 13 is applied and held by the bolts 12.

In the use of the device it will be quite evident that the wide flat surface of the auxiliary wheel will ride upon the ground and prevent sinking of the vehicle wheel into the ground, the device being of great advantage when travelling over soft, boggy or muddy ground. It is of course true that the device is of equal advantage when traveling over snow especially as the transverse ribs or cleats 17 will operate to give the necessary traction so that the wheels cannot spin idly.

From the foregoing description and a study of the drawings it will be apparent that I have thus provided a simply constructed, inexpensive and easily applied device for the purpose specified which will efficiently perform all the functions for which it is intended and which on account of the fewness of parts and the ruggedness of construction is not likely to get out of order but should have a long and satisfactory life.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. Means for securing an auxiliary wheel upon a vehicle wheel of the spoke type, the auxiliary wheel having spokes, comprising plate members disposed against the spokes of the auxiliary wheel and formed with slots at one end, U-shaped members pivotally connected at one end with said plate members and having their other ends formed with threaded extensions, said U-shaped member being embracingly engaged about the spokes of the vehicle wheel with the threaded extensions passing through the slots, and nuts on said extensions for effecting a clamping action.

2. An auxiliary wheel for attachment to the wheels of a motor vehicle, comprising a cylindrical band, a collar member located at the center of the band, a plurality of spokes radiating from the collar and secured thereto and to the band, and clamping means carried by said spokes and adapted for engagement about the spokes of a vehicle wheel, said clamping means comprising a plurality of U-bolts arranged in embracing relation to said spokes and adapted to be engaged about the spokes of the vehicle wheel, and clamping means carried by said U-bolts.

3. An auxiliary wheel for attachment to the wheels of a motor vehicle, comprising a cylindrical band, a collar member located at the center of the band, a plurality of spokes radiating from the collar and secured thereto and to the band, and clamping means carried by said spokes and adapted for engagement about the spokes of a vehicle wheel, said means comprising a U-bolt straddling each of said first named spokes and having one arm longer than the other and threaded, the shorter arm being coiled to define an eye, a clamping plate pivoted at the eye and having a slotted end for engagement upon the longer leg of the U-bolt, and a nut engaged upon said threaded end for urging said clamping plate into engagement with the vehicle wheel spoke.

In testimony whereof I affix my signature.

JOHN J. ZWALSH.